(12) United States Patent
Kotake et al.

(10) Patent No.: US 9,733,339 B2
(45) Date of Patent: Aug. 15, 2017

(54) POSITION AND ORIENTATION CALIBRATION METHOD AND APPARATUS

(71) Applicant: CANON KABUSHIKI KAISHA, Tokyo (JP)

(72) Inventors: Daisuke Kotake, Yokohama (JP); Shinji Uchiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/821,570

(22) Filed: Aug. 7, 2015

(65) Prior Publication Data

US 2015/0348271 A1 Dec. 3, 2015

Related U.S. Application Data

(63) Continuation of application No. 14/045,691, filed on Oct. 3, 2013, which is a continuation of application
(Continued)

(30) Foreign Application Priority Data

Jul. 28, 2009 (JP) .................................. 2009-175387

(51) Int. Cl.
*G06K 9/00* (2006.01)
*G01S 5/16* (2006.01)
(Continued)

(52) U.S. Cl.
CPC ............... *G01S 5/163* (2013.01); *G01S 11/12* (2013.01); *G01S 17/875* (2013.01);
(Continued)

(58) Field of Classification Search
None
See application file for complete search history.

(56) References Cited

U.S. PATENT DOCUMENTS 5,819,016 A * 10/1998 Watanabe ............ G01B 11/002
345/419
7,092,109 B2 * 8/2006 Satoh .................... G06F 3/0325
348/139
(Continued)

FOREIGN PATENT DOCUMENTS

CN 1517902 A 8/2004
CN 1578414 A 2/2005
(Continued)

OTHER PUBLICATIONS

Zillich et al., "Robust object tracking for robot manipulation and navigation", International Archives of Photogrammetry and Remote Sensing, vol. XXXIII, Part B5, Amsterdam 2000.*
(Continued)

*Primary Examiner* — Soo Park
(74) *Attorney, Agent, or Firm* — Canon USA, Inc. IP Division

(57) ABSTRACT

A position and orientation measuring apparatus calculates a difference between an image feature of a two-dimensional image of an object and a projected image of a three-dimensional model in a stored position and orientation of the object projected on the two-dimensional image. The position and orientation measuring apparatus further calculates a difference between three-dimensional coordinate information and a three-dimensional model in the stored position and orientation of the object. The position and orientation measuring apparatus then converts a dimension of the first difference and/or the second difference to cause the first difference and the second difference to have an equivalent dimension and corrects the stored position and orientation.

14 Claims, 10 Drawing Sheets

Related U.S. Application Data

No. 13/387,090, filed as application No. PCT/JP2010/004424 on Jul. 6, 2010, now Pat. No. 8,577,176.

(51) Int. Cl.

| | | |
|---|---|---|
| *G06K 9/46* | (2006.01) | |
| *G06T 7/40* | (2017.01) | |
| *G06K 9/62* | (2006.01) | |
| *G06K 9/52* | (2006.01) | |
| *G01S 11/12* | (2006.01) | |
| *G01S 17/87* | (2006.01) | |
| *G06T 7/80* | (2017.01) | |
| *G06T 7/73* | (2017.01) | |

(52) U.S. Cl.
CPC ............ *G06K 9/4604* (2013.01); *G06K 9/52* (2013.01); *G06K 9/6215* (2013.01); *G06T 7/40* (2013.01); *G06T 7/73* (2017.01); *G06T 7/75* (2017.01); *G06T 7/80* (2017.01); *G06T 2207/20068* (2013.01)

(56) References Cited

U.S. PATENT DOCUMENTS

| | | | | |
|---|---|---|---|---|
| 7,313,266 | B2 * | 12/2007 | Ishiyama | G06K 9/00234 345/419 |
| 7,616,807 | B2 * | 11/2009 | Zhang | G06T 7/246 345/419 |
| 8,059,889 | B2 * | 11/2011 | Kobayashi | G06K 9/209 348/135 |
| 8,144,238 | B2 * | 3/2012 | Kotake | G06K 9/3216 348/239 |
| 8,223,146 | B2 * | 7/2012 | Kotake | G02B 27/017 345/420 |
| 8,326,021 | B2 * | 12/2012 | Kobayashi | G06T 7/0028 382/128 |
| 8,391,589 | B2 * | 3/2013 | Kotake | G01C 11/00 382/154 |
| 8,483,424 | B2 * | 7/2013 | Kotake | G06T 7/0046 382/100 |
| 8,520,931 | B2 * | 8/2013 | Tateno | G06K 9/00208 382/101 |
| 8,711,214 | B2 * | 4/2014 | Fujiki | H04N 7/181 348/135 |
| 8,823,779 | B2 * | 9/2014 | Nakamura | G06T 7/0046 348/169 |
| 9,111,177 | B2 * | 8/2015 | Tateno | G01B 11/03 |
| 2003/0035098 | A1 | 2/2003 | Ishiyama | |
| 2008/0260238 | A1 | 10/2008 | Pfister | |
| 2008/0292180 | A1 * | 11/2008 | Kobayashi | G06K 9/209 382/154 |

FOREIGN PATENT DOCUMENTS

| | | |
|---|---|---|
| CN | 1604015 A | 4/2005 |
| CN | 101116101 A | 1/2008 |

OTHER PUBLICATIONS

Reitmayr et al., "Going out: robust model-based tracking for outdoor augmented reality", ISMAR '06 Proceedings of the 5th IEEE and ACM International Symposium on Mixed and Augmented Reality.*

Byung-Doo Yim et al., "Mobile Robot Localization Using Fusion of Object Recognition and Range Information", 2007 IEEE International Conference on Robotics and Automation—Apr. 10-14, 2007, Roma, Italy, Apr. 10, 2007, pp. 3533-3538.

Devy M et al., "Multi-sensory fusion and model-based recognition of complex objects", Multisensor Fusion and Integration for Intelligent Systems, 1994. IEEE International Conference on MFI '94, Las Vegas, NV, USA, Oct. 2-5, 1994, pp. 345-352.

Hiura S et al., "Real-Time Tracking of Free-Form Objects by Range and Intensity Image Fusion", Systems & Computers in Japan, Wiley, Hoboken, NJ, US, vol. 29, No. 8, Jul. 1, 1998, pp. 19-27.

* cited by examiner

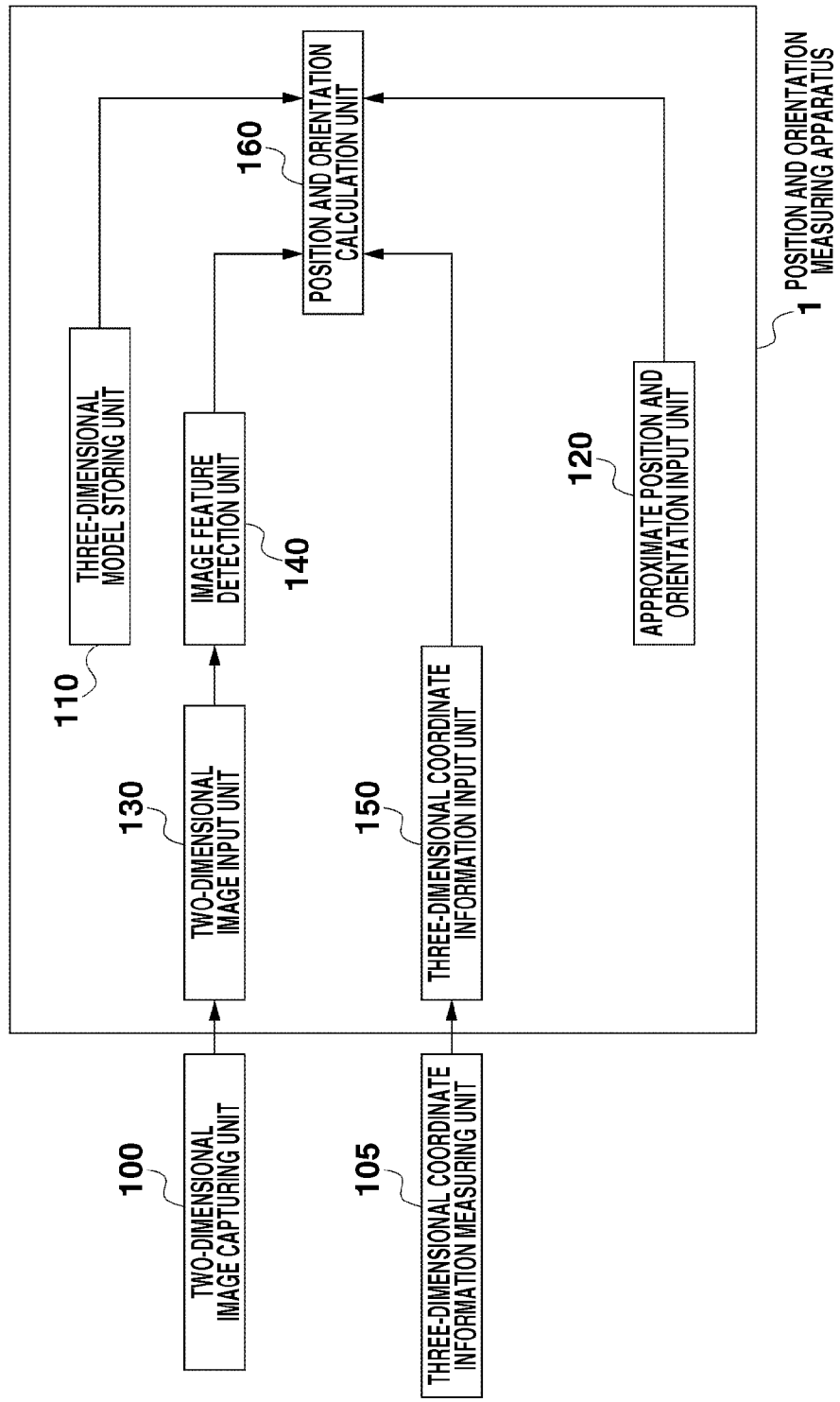

FIG.2C

| POINT | X | Y | Z |
|---|---|---|---|
| P1 | 200 | 200 | 0 |
| P2 | 200 | 200 | 150 |
| P3 | 100 | 200 | 150 |
| P4 | 100 | 200 | 350 |
| P5 | 200 | 200 | 350 |
| P6 | 200 | 200 | 500 |
| P7 | 0 | 200 | 500 |
| P8 | 0 | 200 | 0 |
| P9 | 0 | 100 | 0 |
| P10 | 0 | 100 | 500 |
| P11 | 0 | 0 | 500 |
| P12 | 0 | 0 | 0 |
| P13 | 200 | 0 | 0 |
| P14 | 200 | 0 | 500 |

FIG.2D

| LINE | POINTS ON BOTH ENDS |
|---|---|
| L1 | P1-P6 |
| L2 | P2-P3 |
| L3 | P3-P4 |
| L4 | P4-P5 |
| L5 | P6-P7 |
| L6 | P7-P11 |
| L7 | P11-P12 |
| L8 | P12-P130 |
| L9 | P1-P13 |
| L10 | P8-P12 |
| L11 | P9-P10 |
| L12 | P7-P8 |
| L13 | P1-P8 |
| L14 | P13-P14 |
| L15 | P6-P14 |
| L16 | P11-P14 |

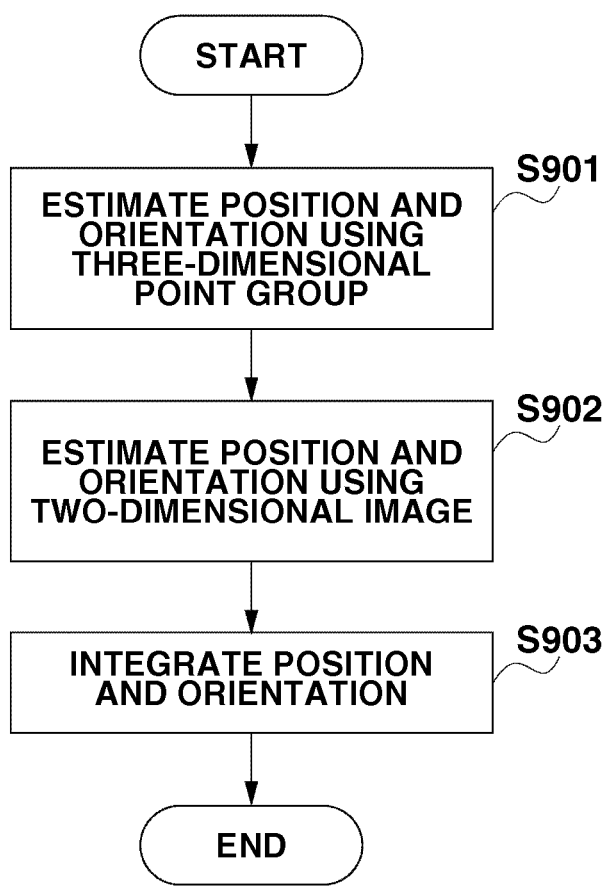

POSITION AND ORIENTATION CALIBRATION METHOD AND APPARATUS

CROSS-REFERENCE TO RELATED APPLICATIONS

This application is a Continuation of co-pending U.S. patent application Ser. No. 14/045,691, filed Oct. 3, 2013; which is a Continuation of co-pending U.S. patent application Ser. No. 13/387,090 filed Jan. 25, 2012, which is a National Phase application of International Application PCT/JP2010/004424, filed Jul. 6, 2010, which claims the benefit of Japanese Patent Application No. 2009-175387, filed Jul. 28, 2009. The disclosures of the above-named applications are hereby incorporated by reference herein in their entirety.

TECHNICAL FIELD

The present invention relates to a technique for measuring a position and orientation of an object whose three-dimensional shape is known.

BACKGROUND ART

In recent years, along with the development in robotics, robots have begun to perform complex tasks that have conventionally been performed by human hand, such as assembling of industrial products. When such robots hold and assemble the parts using end effectors including hands, it becomes necessary to measure a relative position and orientation between the parts to be held and the robot (hand).

The position and orientation of an object can be measured by employing model fitting in which a three-dimensional model of an object is fitted to features detected from a two-dimensional image or to a range image. When performing model fitting with respect to the two-dimensional image, the position and orientation is estimated so that a projected image acquired when projecting the three-dimensional model on the image based on the position and orientation of the object matches the detected features. When performing model fitting with respect to the range image, each of the points in the range image is converted to a three-dimensional point group having three-dimensional coordinates. The position and orientation is then estimated so that the three-dimensional model fits the three-dimensional point group in a three-dimensional space.

However, a detected position of the feature in the two-dimensional image or the three-dimensional coordinates of the point groups contain errors. Such errors are caused by a quantization error of a pixel, blur, accuracy of a feature detection algorithm, and correspondence between cameras. Processes are thus performed to improve the measurement accuracy of the position and orientation, such as averaging an effect of the measurement errors included in a plurality of pieces of measurement information (i.e., features of the image and point group).

The position and orientation of an object can be measured with high accuracy by estimating the position and orientation using gradients of an intensity image and a range image without explicitly performing feature detection (Hiura, Yamaguchi, Sato, Ikenouchi, "Real-Time Tracking of Free-Form Objects by Range and Intensity Image Fusion", Denshi Joho Tsushin Gakkai Ronbunshi, Vol. J80-D-II, No. 11, November 1997, pp. 2904-2911). In such a method, it is assumed that brightness and the range vary smoothly when the object moves. An orientation parameter of the object is then calculated from the change in the brightness of the intensity image and the change in the range of the range image based on a gradient method. However, since the dimensions are different between the two-dimensional intensity image and the three-dimensional range image, it is difficult to effectively fuse the two images. It thus becomes necessary to perform manual tuning to calculate the orientation parameter.

SUMMARY OF INVENTION

The present invention is directed to a position and orientation calibration method capable of accurately measuring the position and orientation of various objects. The position and orientation calibration method is realized by effectively fusing measurement information acquired from a two-dimensional image and measurement information acquired from a range image to estimate the position and orientation.

According to an aspect of the present invention, a position and orientation calibration method for repeatedly correcting a previously stored position and orientation of an object includes inputting a two-dimensional image of the object, detecting an image feature from the two-dimensional image, inputting three-dimensional coordinate information of a surface of the object, calculating a first difference between the detected image feature and a projected feature of a projected image acquired when projecting a previously stored three-dimensional model onto the two-dimensional image based on the previously stored position and orientation of the object, calculating a second difference between a three-dimensional feature of the three-dimensional coordinate information and a model feature of the three-dimensional model in the stored position and orientation, converting a dimension of the first difference and/or the second difference to cause the first difference and the second difference to have an equivalent dimension, and correcting the stored position and orientation based on the first difference and the second difference the dimension of at least one of the first difference and the second difference has been converted.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a configuration of a position and orientation measuring apparatus according to an exemplary embodiment of the present invention.

FIG. 2C illustrates the three-dimensional model.

FIG. 2D illustrates the three-dimensional model.

FIG. 9 is a flowchart illustrating in detail a position and orientation calibration process according to a third exemplary embodiment of the present invention.

DESCRIPTION OF EMBODIMENTS

Figure 2A:
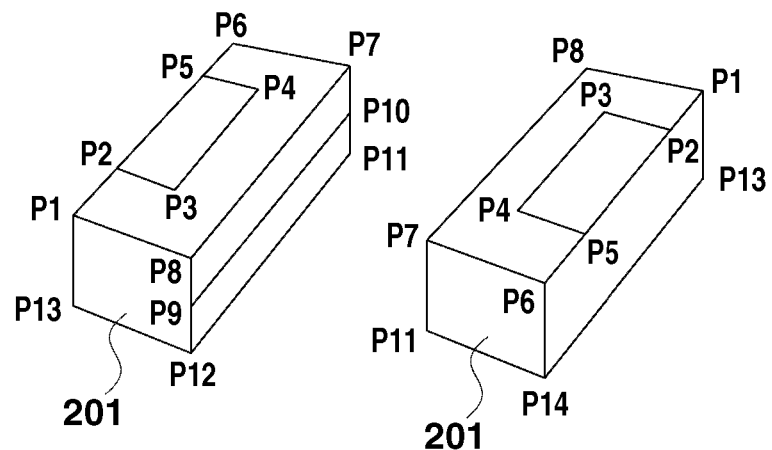
FIG. 2A illustrates a three-dimensional model according to an exemplary embodiment of the present invention.
Figure 2B:
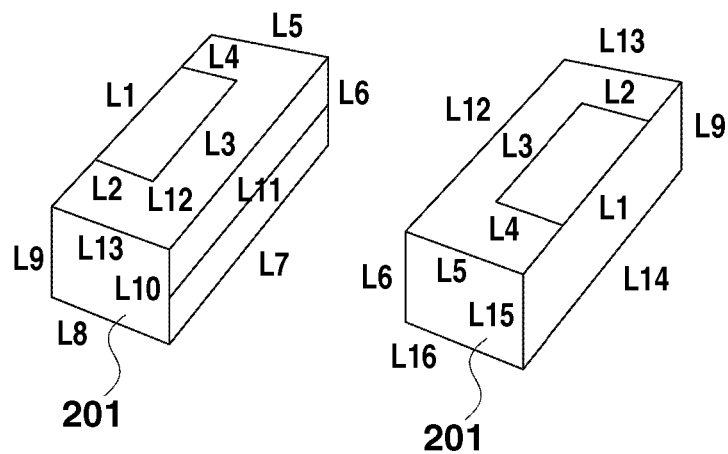
FIG. 2B illustrates the three-dimensional model.

Various exemplary embodiments, features, and aspects of the invention will be described in detail below with reference to the drawings.

According to a first exemplary embodiment of the present invention, the position and orientation of an object is measured by performing model fitting. The model fitting simultaneously uses the measurement information acquired from the two-dimensional image (i.e., image features) and the measurement information acquired from the range image (i.e., three-dimensional point group). Both of the above-described methods which use the two-dimensional image and the range image write linear equations that include a correction value of the position and orientation as an unknown variable. The equations are written to offset the errors in the image and in the three-dimensional space for each of the measurement information by correcting the position and orientation. The position and orientation can then be estimated using both of the measurement information simultaneously by writing the linear equation for each of the two-dimensional and three-dimensional measurement information and solving as a set of simultaneous equations. However, since an evaluation dimension is different for the error in the image and the error in the three-dimensional space, the effect of either one of the measurement information becomes greater. The advantage of simultaneously using the measurement information is thus reduced. To solve such a problem, the present exemplary embodiment uniforms the evaluation dimension so that the error in the two-dimensional image corresponds to the error in the three-dimensional space.

FIG. 1 illustrates a configuration of a position and orientation measuring apparatus 1 according to the present exemplary embodiment. Referring to FIG. 1, the position and orientation measuring apparatus 1 includes a three-dimensional model storing unit 110, an approximate position and orientation input unit 120, a two-dimensional image input unit 130, an image feature detection unit 140, a three-dimensional coordinate information input unit 150, and a position and orientation calculation unit 160. Further, the position and orientation measuring apparatus 1 is connected to a two-dimensional image capturing unit 100 and a three-dimensional coordinate information measuring unit 105. Each of the components of the position and orientation measuring apparatus 1 will be described below.

The two-dimensional image capturing unit 100 is a camera for capturing a normal two-dimensional image. The captured two-dimensional image may be an intensity image or a color image.

The two-dimensional image input unit 130 inputs to the position and orientation measuring apparatus 1 an image captured by the two-dimensional image capturing unit 100. Internal parameters such as focal length, principal point, and lens distortion parameter may be previously calibrated (R. Y. Tsai, "A versatile camera calibration technique for high-accuracy 3D machine vision metrology using off-the-shelf TV cameras and lenses", IEEE Journal of Robotics and Automation, vol. RA-3, no. 4, 1987).

The three-dimensional coordinate information measuring unit 105 measures the three-dimensional information of points on a surface of the object to be measured. According to the present exemplary embodiment, a range sensor which outputs the range image is used as the three-dimensional coordinate information measuring unit 105. The range image is an image in which each pixel has depth information. The range sensor according to the present exemplary embodiment is an active range sensor in which the camera captures reflected light of a laser beam irradiated on a target and a distance is measured by triangulation. However, the range sensor is not limited to the above and may be a time-of-flight sensor which employs flight time of the light. Such active sensors are suitable for use when the surface of the target object has less texture. Further, a passive range sensor which calculates the depth of each pixel from the image captured by a stereo camera by triangulation may be used. The passive range sensor is suitable when the target object has enough surface texture. Any sensor which measures the range image may be used according to the present invention.

The three-dimensional coordinate information input unit 150 acquires the three-dimensional information measured by the three-dimensional coordinate information measuring unit 105. The three-dimensional coordinate information input unit 150 then converts each pixel in the range image to point group data, i.e., the three-dimensional coordinate information in a camera coordinate system, based on the known relative positions and orientations of the range sensor and the camera. The three-dimensional coordinate information input unit 150 inputs the converted point group data to the position and orientation measuring apparatus 1. It is assumed that the range sensor and the camera are fixedly positioned with respect to each other, and the relative position and orientation thereof does not change. The relative position and orientation may thus be previously calibrated. For example, a calibration object whose three-dimensional shape is known is observed from various directions. The relative position and orientation is then acquired from a difference between the position and orientation of the calibration object based on the two-dimensional image and the position and orientation of the calibration object based on the range image.

It is assumed that the camera captures the image at the same time as the range sensor measures the distance. However, if the positions and orientations of the position and orientation measuring apparatus 1 and the target object do not change, such as when the target object is stationary, it is not necessary to simultaneously capture the image and measure the distance.

The three-dimensional model storing unit 110 stores the three-dimensional model of the object whose position and orientation is to be measured. According to the present exemplary embodiment, the object is described as a three-dimensional model configured of line segments and planes.

FIGS. 2A, 2B, 2C, and 2D illustrate three-dimensional models according to the present exemplary embodiment of the present invention. The three-dimensional model is defined as a set of points and a set of line segments connecting the points. Referring to FIG. 2A, the three-dimensional model of an observation object 201 includes 14 points, i.e., point P1 to point P14. Further, referring to FIG. 2B, the three-dimensional model of the observation object 201 includes 16 line segments, i.e., line segment L1 to line segment L16. Referring to FIG. 2C, each of point P1 to point P14 is indicated by a three-dimensional coordinate value. Furthermore, each of line segments L1 to line segment L16 is indicated by identification (ID) configured of the points configuring the line segment. Moreover, the three-dimensional geometric model stores information about the planes. Each plane is indicated by the points configuring the plane. The three-dimensional model illustrated in FIGS. 2A, 2B, 2C, and 2D store information about six planes configuring a cuboid. The three-dimensional model is used when the position and orientation calculation unit 160 calculates the position and orientation of the object.

The approximate position and orientation input unit 120 inputs the approximate value of the position and orientation of the object with respect to the position and orientation measuring apparatus 1. The position and orientation of the object with respect to the position and orientation measuring apparatus 1 indicates the position and orientation of the object in the camera coordinate system. However, the position and the orientation may be based on any portion of the position and orientation measuring apparatus 1 if the relative position with respect to the camera coordinate system is known and does not change.

According to the present exemplary embodiment, it is assumed that the position and orientation measuring apparatus 1 continuously measures the position and orientation in the direction of a temporal axis. The previous measurement value (i.e., a value measured at the previous time) is thus used as the approximate position and orientation. However, the method for inputting the approximate value of the position and orientation is not limited to the above. For example, speed or angular speed of the object may be estimated using a time-series filter, based on the past measurement of the position and orientation. The present position and orientation may then be predicted from the past position and orientation and estimated speed and acceleration.

Further, if there is another sensor capable of measuring the position and orientation of the object, an output value of such sensor may be used as the approximate value of the position and orientation. The sensor may be a magnetic sensor which measures the position and orientation using a receiver to be attached to the object to detect a magnetic field generated by a transmitter. Further, the sensor may be an optical sensor which measures the position and orientation using a camera fixed to a scene to capture a marker disposed on the object. Furthermore, any sensor which measures a position and operation of six degrees of freedom may be used. Moreover, if the approximate position and orientation of the object is previously known, such value may be used as the approximate value.

The image feature detection unit 140 detects the image features from the two-dimensional image input from the two-dimensional image input unit 130. According to the present exemplary embodiment, the image feature detection unit 140 detects an edge as the image feature.

The position and orientation calculation unit 160 fits the three-dimensional model stored in the three-dimensional model storing unit 110 to the image feature detected by the image feature detection unit 140. The position and orientation calculation unit 160 also fits the three-dimensional model to the three-dimensional point group input by the three-dimensional coordinate information input unit 150. The position and orientation of the object is thus measured by such fitting processes.

Figure 3:
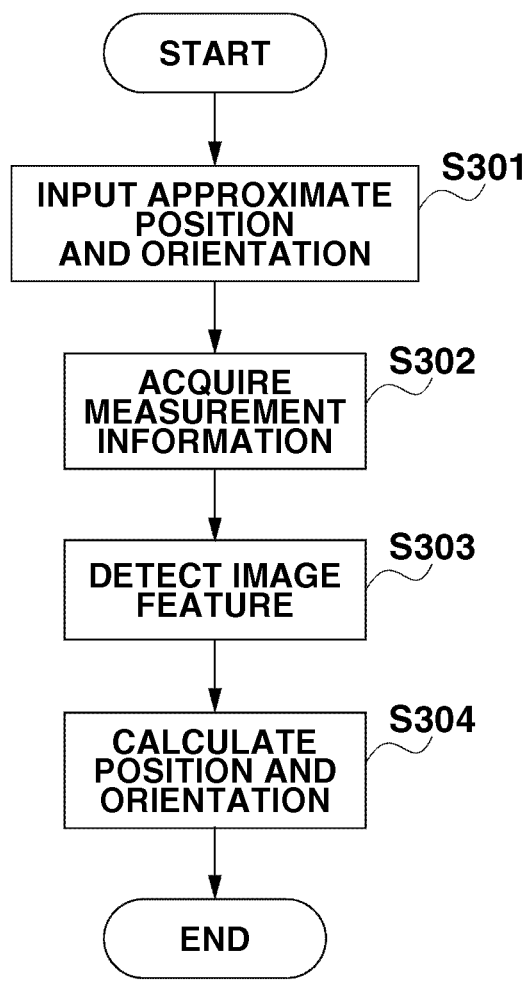
FIG. 3 is a flowchart illustrating a position and orientation calibration process according to a first exemplary embodiment of the present invention.

FIG. 3 is a flowchart illustrating a process for measuring the position and orientation according to the first exemplary embodiment of the present invention.

In step S301 illustrated in FIG. 3, an operator uses the approximate position and orientation input unit 120 to input to the position and orientation measuring apparatus 1 the approximate value of the position and orientation of the object with respect to the position and orientation measuring apparatus 1 (i.e., a camera). As described above, according to the present exemplary embodiment, the position and orientation measured at the previous time is used as the approximate value.

In step S302, the position and orientation measuring apparatus 1 acquires the measurement information for calculating the position and orientation of the object by performing model fitting. More specifically, the position and orientation measuring apparatus 1 acquires the two-dimensional image and the three-dimensional information of the target object.

According to the present exemplary embodiment, the three-dimensional coordinate information measuring unit 105 outputs the range image as the three-dimensional information. The depth value measured from a viewpoint position is recorded in each pixel of the range image, unlike in the two-dimensional image in which an intensity value and a color value are recorded in each pixel. The two-dimensional image captured by the two-dimensional image capturing unit 100 is input to the position and orientation measuring apparatus 1 via the two-dimensional image input unit 130. Further, the range image output from the three-dimensional coordinate information measuring unit 105 is input to the position and orientation measuring apparatus 1 via the three-dimensional coordinate information input unit 150. As described above, the range image is converted to the three-dimensional point group data which is the three-dimensional coordinate information in the camera coordinate system and then input to the position and orientation measuring apparatus 1. The range image is converted to the three-dimensional point group by multiplying by the depth value an eye vector corresponding to a pixel position for each pixel in the range image.

In step S303, the position and orientation measuring apparatus 1 detects the image features from the two-dimensional image input in step S302. According to the present exemplary embodiment, the position and orientation measuring apparatus 1 detects the edge as the image feature. The edge is an extreme value of a density gradient.

Figure 4A:
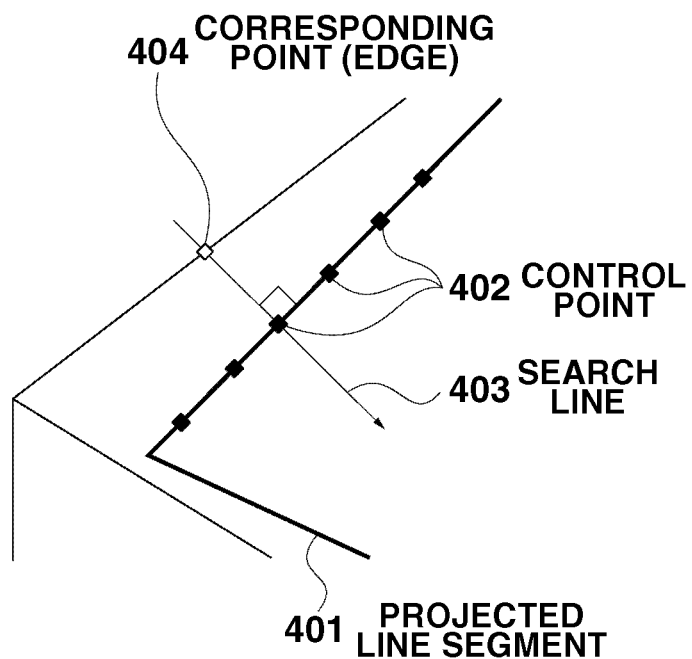
FIG. 4A illustrates edge detection from an image.
Figure 4B:
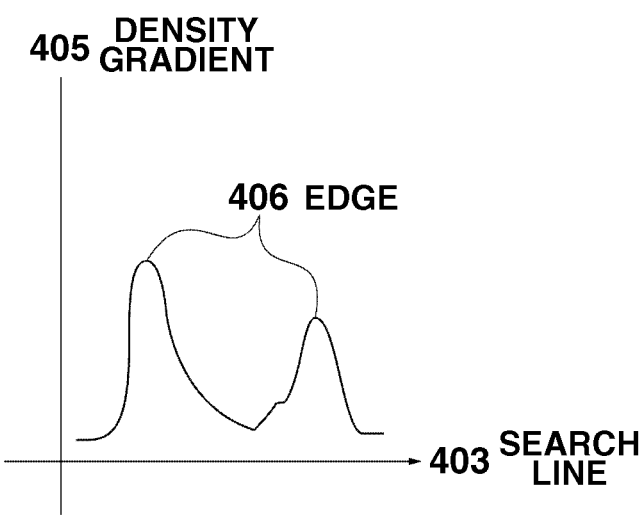
FIG. 4B illustrates edge detection from an image.

FIGS. 4A and 4B illustrate edge detection according to the present exemplary embodiment. The position and orientation measuring apparatus 1 calculates the projected image of each line segment configuring the three-dimensional model on the image, using the approximate position and orientation of the object to be measured which is input in step S301 and the corrected internal parameter of the two-dimensional image capturing unit 100.

Referring to FIGS. 4A and 4B, the position and orientation measuring apparatus 1 then sets control points 402 at equal intervals on a line segment 401 projected on the image. The position and orientation measuring apparatus 1 detects a one-dimensional edge 404 in a normal direction 403 of the projected line segment 401 for each control point 402. Since the edge is detected as an extreme value of a density gradient 405 of the pixel value, a plurality of edges 406 may be detected when there is an edge in the vicinity. According to the present exemplary embodiment, all of the detected edges are stored as hypotheses (L. Vacchetti, V. Lepetit, and P. Fua, "Combining edge and texture information for real-time accurate 3D camera tracking", Proc. 3rd IEEE/ACM International Symposium on Mixed and Augmented Reality (ISMAR '04), pp. 48-57, 2004).

Figure 5:
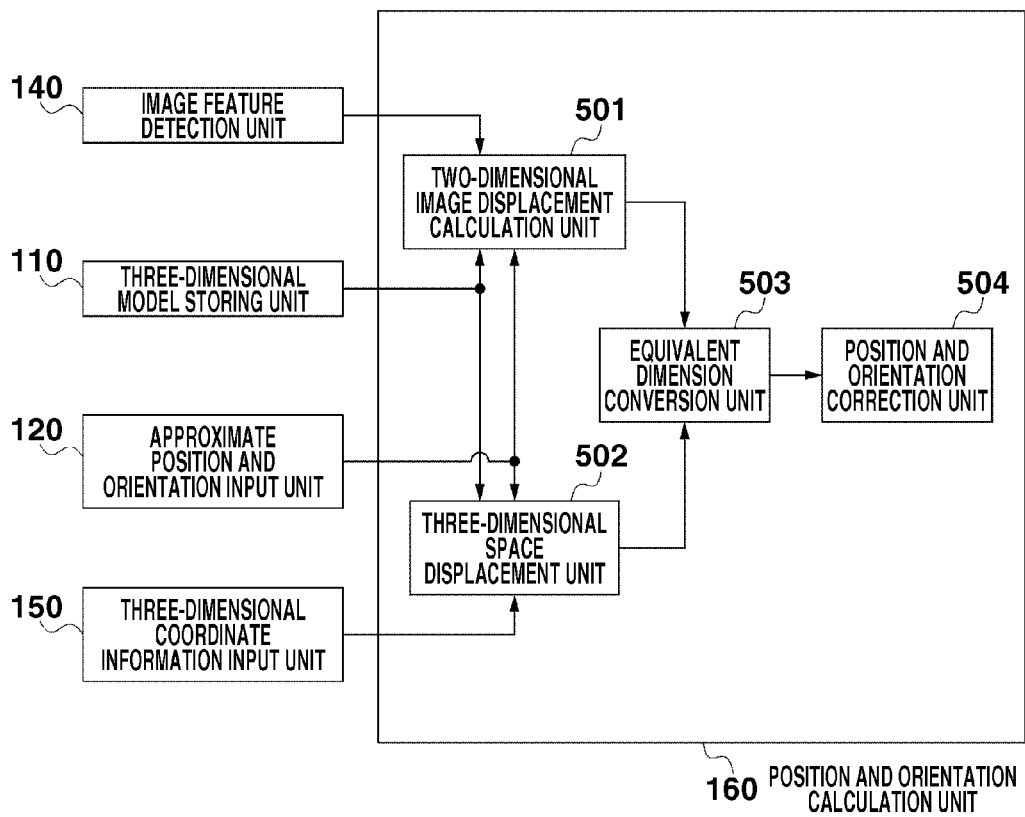
FIG. 5 illustrates a configuration of a position and orientation calculation unit according to the first exemplary embodiment of the present invention.

FIG. 5 illustrates a configuration of the position and orientation calculation unit 160.

In step S304, the position and orientation calculation unit 160 fits the three-dimensional model to the edges detected in step S303 and the three-dimensional point group input in step S302 to calculate the position and orientation of the object to be measured.

Referring to FIG. 5, a two-dimensional image displacement calculation unit 501 calculates a distance between the image feature i.e., the detected edge on the image, and the projected image, i.e., the line segment projected on the image based on the estimated position and orientation.

A three-dimensional space displacement calculation unit 502 calculates a distance between the three-dimensional feature, i.e., each point configuring the point group data, and a model feature, i.e., a plane converted to the coordinate system of the three-dimensional coordinate information input unit 150 based on the position and orientation.

An equivalent dimension conversion unit 503 optimizes the position and orientation based on the calculated distances. More specifically, the equivalent dimension conversion unit 503 calculates a signed distance between the point and the line in the two-dimensional image and a signed distance between the point and the plane in the three-dimensional space. The equivalent dimension conversion unit 503 then performs linear approximation of the two signed distances as a function of the position and orientation of the object. The equivalent dimension conversion unit 503 writes linear equations that are true for each measurement information when the signed distance is 0.

A position and orientation correction unit 504 solves the linear equations as a set of simultaneous equations to acquire a minute change in the position and orientation of the object and corrects the position and orientation. The finalized position and orientation is thus calculated by repeating the above-described process.

As described above, since the dimensions of the distances in the image and in the three-dimensional space are different, a contribution ratio becomes biased towards one of pieces of measurement information if the simultaneous equation is simply solved. In such a case, the advantage of using the two types of measurement information becomes reduced, and improvement in the accuracy cannot be expected. According to the present exemplary embodiment, the dimensions are thus uniformed by converting the distance in the two-dimensional image to the distance in the three-dimensional space, so that the contribution ratio is prevented from becoming biased. The process for calculating the position and orientation will be described below.

Figure 6:
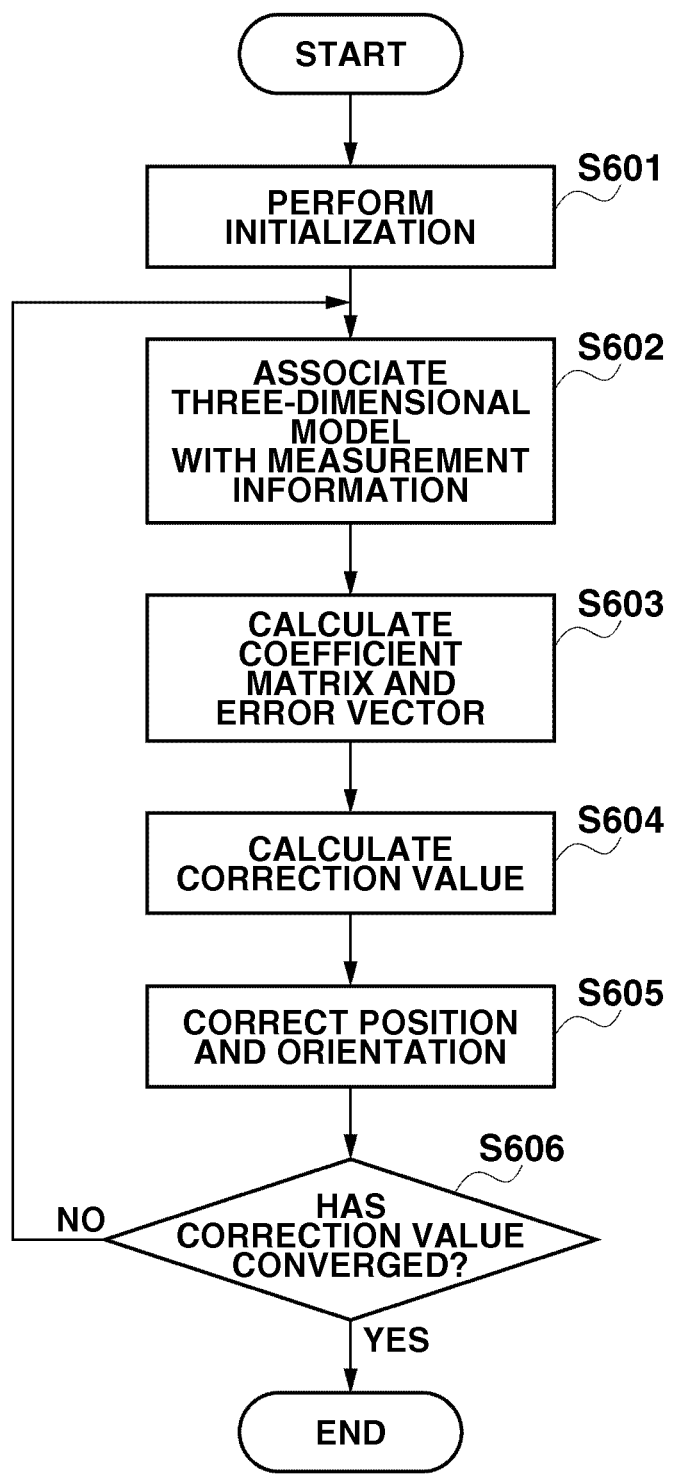
FIG. 6 is a flowchart illustrating a position and orientation calculation process according to a first exemplary embodiment of the present invention.

FIG. 6 is a flowchart illustrating in detail a process for calculating the position and orientation of the object performed in step S304 illustrated in FIG. 3.

In the process, the position and orientation calculation unit 160 repeatedly corrects the approximate value of the position and orientation of the object to be measured (hereinafter referred to as a six-dimensional vector s) by iterative operation. The position and orientation calculation unit 160 performs such a process using Gauss-Newton method which is a non-linear optimization method. However, the method for calculating the position and orientation of the object to be measured is not limited to the Gauss-Newton method. For example, Levenberg-Marquardt method in which the calculation is more robust may be used, or a steepest descent method which is a simpler method may be used. Further, non-linear optimization calculation methods such as a conjugate gradient method and Incomplete Cholesky Conjugate Gradient (ICCG) method may be used.

In step S601 illustrated in FIG. 6, the position and orientation calculation unit 160 performs initialization. In other words, the position and orientation calculation unit 160 inputs as the approximate value of the position and orientation calculation the approximate position and orientation of the object to be measured acquired in step S301.

In step S602, the position and orientation calculation unit 160 associates the three-dimensional model with the measurement information.

More specifically, the position and orientation calculation unit 160 associates the three-dimensional model with the image feature. In step S303 illustrated in FIG. 3, a plurality of edges has been detected as hypotheses with respect to the control points. In step S602, the position and orientation calculation unit 160 associates with the control point the edge among the detected plurality of edges in the image which is closest to the line segment projected based on the approximate value of the position and orientation.

The position and orientation calculation unit 160 then associates the three-dimensional model with the point group data by performing coordinate conversion on the three-dimensional model or the point group data based on the approximate value of the position and orientation. The position and orientation calculation unit 160 then searches for the closest plane in the three-dimensional space for each point in the point group data and associates the plane with each point.

In step S603, the position and orientation calculation unit 160 calculates a coefficient matrix and an error vector for calculating the position and orientation of the object. Each element in the coefficient matrix with respect to the edge is a linear partial differential coefficient for each element of the position and orientation of the object when the distance between the point and the line in the image is defined as a function of the position and orientation. Further, each element in the coefficient matrix with respect to the point group data is a linear partial differential coefficient for each element of the position and orientation when the distance between the point and the plane in the three-dimensional space is defined as a function of the position and orientation. The error vector with respect to the edge is the signed distance between the projected line segment and the detected edge in the image. The error vector with respect to the point group data is the signed distance between the point and the plane of the model in the three-dimensional space.

Derivation of the coefficient matrix will be described below.

Figure 7:
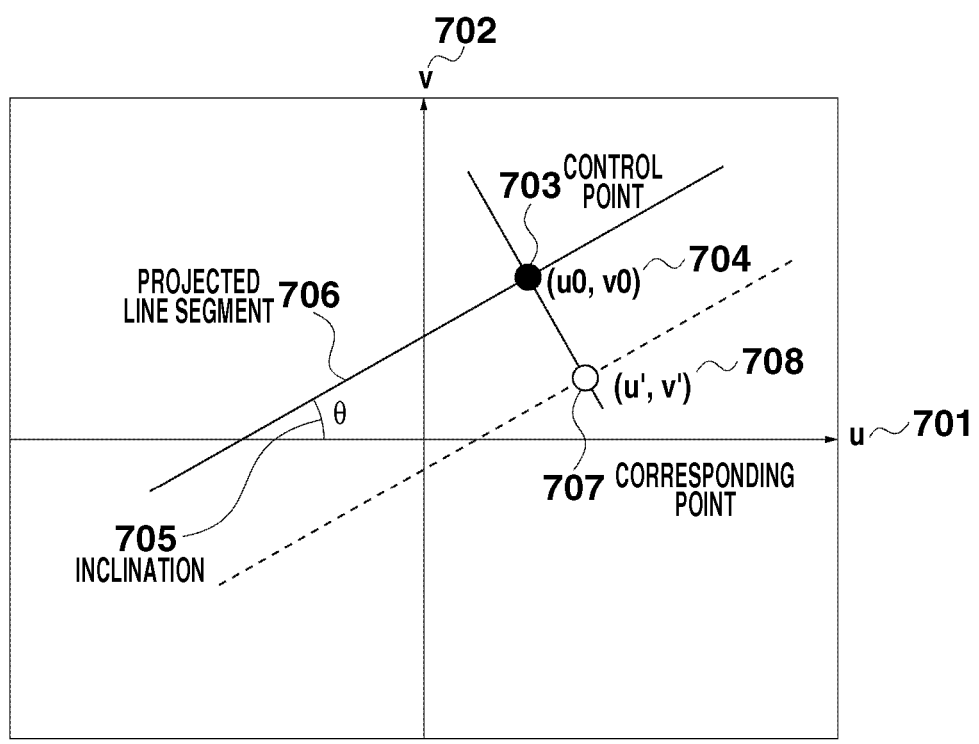
FIG. 7 illustrates a relation between a projected image of a line segment and a detected edge.

FIG. 7 illustrates a relation between the projected image of the line segment and the detected edge. Referring to FIG. 7, a u-axis 701 indicates a horizontal direction of the image, and a v-axis 702 indicates a vertical direction of the image. Coordinates 704 of a control point 703 (i.e., a point which divides each of the projected line segment at equivalent intervals in the image) in the image are expressed as (u0, v0). An inclination with respect to the u-axis 701 of the line segment including the control point in the image is expressed as .theta. 705. The inclination .theta. 705 is calculated as the inclination of the line connecting, when the three-dimensional coordinates of both ends of the line segment 706 are projected on the image according to s, the coordinates of both ends in the image. The normal vector of the line segment 706 in the image becomes (sin .theta., −cos .theta.). Further, coordinates 708 of a corresponding point 707 of the control point 703 in the image are (u', v'). A point (u, v) on a line (indicated by a broken line in FIG. 7) which passes through the coordinates 708 (u', v') of the corresponding point 707 and whose inclination is .theta. 705 can be expressed as:

$$u \sin\theta - v \cos\theta = d \quad (1)$$

(wherein .theta. is a constant). In equation (1), $$d = u' \sin\theta - v' \cos\theta$$

(wherein d is a constant).

The position of the control point 703 in the image changes according to the position and orientation of the object to be measured. Further, the degree of freedom of the position and orientation of the object to be measured is six degrees of freedom. In other words, s is a six-dimensional vector including three elements indicating the position of the object to be measured and three elements indicating the orientation thereof. The three elements indicating the orientation are expressed by an Euler angle, or as a three-dimensional vector in which the direction indicates an axis of rotation that passes through the origin, and a norm indicates an angle of rotation. The coordinates (u, v) of the point which changes according to the position and orientation in the image can be approximated as in equation (2) by performing a linear Taylor expansion near the coordinates 704 (u0, v0). In equation (2), .capital delta.si (I=1, 2, . . . , 6) indicates a minute change in each component of s.

[Math. 1] (2)

$$u \approx u_0 + \sum_{i=1}^{6} \frac{\partial u}{\partial s_i} \Delta s_i$$

$$v \approx v_0 + \sum_{i=1}^{6} \frac{\partial v}{\partial s_i} \Delta s_i$$

If it is assumed that there is little difference between the approximate value of the position and orientation and the actual position and orientation of the object, it can be assumed that the position of the control point in the image which can be acquired by a correct s is on the line expressed by equation (1). Equation (3) is thus acquired by substituting u and v approximated by equation (2) into equation (1).

[Math. 2] (3)

$$\sin\theta \sum_{i=1}^{6} \frac{\partial u}{\partial s_i} \Delta s_i - \cos\theta \sum_{i=1}^{6} \frac{\partial v}{\partial s_i} \Delta s_i = d - r$$

In equation (3), $$r = u0 \sin\theta - v0 \cos\theta$$

(wherein r is a constant). Equation (3) can be written for all edges that have been associated with the three-dimensional model in step S602.

The three-dimensional coordinates of the point group indicated by the coordinate system of the three-dimensional coordinate information input unit 150 (i.e., the camera coordinate system) are converted to the three-dimensional coordinates (x, y, z) in the coordinate system of the object to be measured, using the position and orientation s of the object to be measured. It is assumed that a point in the point group data is converted to the coordinates of the object to be measured (x0, y0, z0) based on the approximate position and orientation. The three-dimensional coordinates (x, y, z) change according to the position and orientation of the object to be measured and can be approximated as equation (4) by performing the linear Taylor expansion near (x0, y0, z0).

[Math. 3] (4)

$$x \approx x_0 + \sum_{i=1}^{6} \frac{\partial x}{\partial s_i} \Delta s_i$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

An equation in the coordinate system of the object to be measured of a plane in the three-dimensional geometric model associated with a point in the point group data in step S602 is expressed as ax+by+cz=e (wherein a2+b2+c2=1, and a, b, c, and e are constants). It is assumed that (x, y, z) converted by the correct s satisfies the equation of the plane ax+by+cz=e. Equation (5) is thus acquired by substituting equation (4) into the equation of the plane.

[Math. 4] (5)

$$a\sum_{i=1}^{6} \frac{\partial x}{\partial s_i}\Delta s_i + b\sum_{i=1}^{6} \frac{\partial y}{\partial s_i}\Delta s_i + c\sum_{i=1}^{6} \frac{\partial z}{\partial s_i}\Delta s_i = e - q$$

In equation (5), $$q = ax0 + by0 + cz0$$

(wherein q is a constant). Equation (5) can be written for all point group data which has been associated with the three-dimensional model in step S602.

Since equation (3) and equation (5) are equations including the minute change .capital delta.si (i=1, 2, . . . , 6) for each component of s, a linear simultaneous equation with respect to .capital delta.si such as equation (6) can be written.

[Math. 5] (6)

$$\begin{bmatrix} \sin\theta_1 \frac{\partial u}{\partial s_1} - \cos\theta_1 \frac{\partial v}{\partial s_1} & \cdots & \sin\theta_1 \frac{\partial u}{\partial s_6} - \cos\theta_1 \frac{\partial v}{\partial s_6} \\ \vdots & & \vdots \\ a_1 \frac{\partial x}{\partial s_1} + b_1 \frac{\partial y}{\partial s_1} + c_1 \frac{\partial z}{\partial s_1} & \cdots & a_1 \frac{\partial x}{\partial s_6} + b_1 \frac{\partial y}{\partial s_6} + c_1 \frac{\partial z}{\partial s_6} \\ \vdots & & \end{bmatrix} \begin{bmatrix} \Delta s_1 \\ \vdots \\ \Delta s_6 \end{bmatrix} = \begin{bmatrix} d_1 - r_1 \\ \vdots \\ e_1 - q_1 \end{bmatrix}$$

As described above, since the error vector on the right side of equation (6) is the signed distance in the image with respect to the edge and the signed distance in the three-dimensional space with respect to the point group, the dimensions do not match. The error in the image is thus approximated to an error in the three-dimensional space by multiplying the error in the image by the depth of the edge. As a result, the dimensions are uniformed to the distance in the three-dimensional space. Since the depth information cannot be acquired from the two-dimensional image, it is necessary to acquire the depth of the edge by performing an approximation method.

Figure 8:
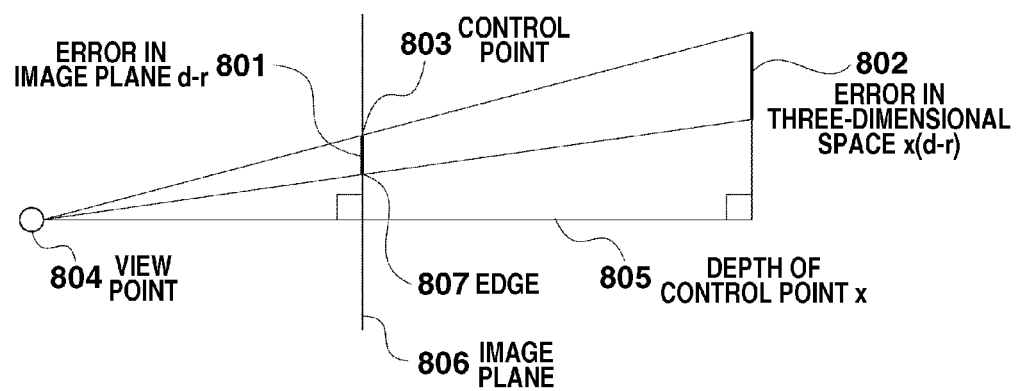
FIG. 8 illustrates a method for approximating an error in an image to an error in the three-dimensional space.

FIG. 8 illustrates a method for approximating an error in the image 801 to an error in the three-dimensional space 802 according to the present exemplary embodiment. Referring to FIG. 8, the error in the image 801 is multiplied by a depth 805 of each control point 803 measured from a view point 804 calculated based on the approximate value of the position and orientation. The error in the image 801 is thus converted to the error in the three-dimensional space 802. Further, the error in the image 801 may be multiplied by a scaling coefficient instead of the depth 805. The scaling coefficient is a length of a perpendicular line drawn with respect to the eye vector passing through the control point 803 in the three-dimensional space to an edge in an image plane 806. A simultaneous equation (7) to be solved becomes as follows.

[Math. 6] (7)

$$\begin{bmatrix} z_1\left(\sin\theta_1 \frac{\partial u}{\partial s_2} - \cos\theta_1 \frac{\partial v}{\partial s_2}\right) & \cdots & z_1\left(\sin\theta_1 \frac{\partial u}{\partial s_6} - \cos\theta_1 \frac{\partial v}{\partial s_6}\right) \\ \vdots & & \vdots \\ a_1\frac{\partial x}{\partial s_2} + b_1\frac{\partial y}{\partial s_2} + c_1\frac{\partial z}{\partial s_2} & \cdots & a_1\frac{\partial x}{\partial s_6} + b_1\frac{\partial y}{\partial s_6} + c_1\frac{\partial z}{\partial s_6} \end{bmatrix} \begin{bmatrix} \Delta s_1 \\ \vdots \\ \Delta s_6 \end{bmatrix} = \begin{bmatrix} z_1(d_1 - r_1) \\ z_2(d_2 - r_2) \\ \vdots \\ e_1 - q_1 \\ \vdots \end{bmatrix}$$

In equation (7), $z_1$, $z_2$, . . . indicate depths of each edge. Equation (7) may also be expressed as equation (8).

$$J.\text{capital delta}.s = E \quad (8)$$

The partial differential coefficient for calculating a coefficient matrix J of the linear simultaneous equation is then calculated.

In step S604, the position and orientation calculation unit 160 acquires a correction amount .capital delta.s of the position and orientation by a least-square criterion based on equation (8) and using a generalized inverse matrix of the matrix J, i.e., $(J^T J)^{-1} J^T$. However, since there often is an outlier in the edge or the point group data due to erroneous detection, a robust estimation method as described below is employed. Generally, the error vector in the right side of equation (7) becomes large in the edge or the point group data which is the outlier. A small weight is thus applied to the information in which an absolute value of the error is large, and a large weight is applied to the information in which the absolute value of the error is small. For example, the weight is applied using Tukey's function as illustrated in equation (9).

[Math. 7] (9)

$$w(z(d-r)) = \begin{cases} (1 - (z(d-r)/c_1)^2)^2 & |z(d-r)| \leq c_1 \\ 0 & |z(d-r)| > c_1 \end{cases}$$

$$w(e-q) = \begin{cases} (1 - ((e-q)/c_2)^2)^2 & |e-q| \leq c_2 \\ 0 & |e-q| > c_2 \end{cases}$$

In equation (9), c1 and c2 are constants. It is not necessary to use Tukey's function for applying the weight and may be any function which applies a small weight to the information whose error is large and a large weight to the information whose error is small. An example of such a function is Huber's function. The weight corresponding to each of the measurement information (the edge or the point group data) is expressed as wi. A weight matrix W is thus defined as in equation (10).

[Math. 8] (10)

$$w = \begin{bmatrix} w_1 & & & 0 \\ & w_2 & & \\ & & \ddots & \\ 0 & & & w_{N_\sigma} \end{bmatrix}$$

The weight matrix W is a square matrix whose components except for diagonal components are all 0, and in which the weight wi is entered in the diagonal components. Equation (8) is then transformed to equation (11) using the weight matrix W.

$$WJ.\text{capital delta}.s = WE \quad (11)$$

The correction value .capital delta.s is thus acquired by solving equation (11) as in equation (12).

[Math. 9]

$$\Delta s (J^T W J)^{-1} J^T W E \quad (12)$$

In step S605, the position and orientation calculation unit 160 then corrects the approximate value of the position and orientation of the object using the correction value .capital delta.s of the position and orientation calculated in step S604. s=s+.capital delta.s In step S606, the position and orientation calculation unit 160 performs a convergence determination. If the position and orientation calculation unit 160 determines that the correction value .capital delta.s has converged (YES in step S606), the process ends. If the position and orientation calculation unit 160 determines that the correction value .capital delta.s has not converged (NO in step S606), the process returns to step S602. The convergence is determined if the correction value .capital delta.s is nearly 0, or if a square sum of the error vector hardly changes before correction and after correction. The position and orientation can thus be calculated by repeating the above-described process until there is convergence.

As described above, according to the first exemplary embodiment, the error in the two-dimensional image is approximately converted to the error in the three-dimensional space. The dimensions of the errors in the two-dimensional image and the point group data are thus uniformed to be viewed as equivalent dimensions and are simultaneously used in measuring the position and orientation of the object.

According to the first exemplary embodiment, the depth calculated from the approximate value of the position and orientation of the control point corresponding to the edge in the image is used as the depth of the edge when converting the error in the two-dimensional image to the error in the three-dimensional space. However, the edge depth may be acquired by other methods. For example, if the range sensor can measure dense range information, and the range information corresponding to each pixel in the two-dimensional image can be acquired from the range sensor, the range information measured by the range sensor may be used as the edge depth.

Further, according to the first exemplary embodiment, the depth of the detected edge in the image is individually calculated. However, an average depth may be used when the object to be measured is sufficiently separated from the position and orientation measuring apparatus and the entire object can be expressed as the depth. The average depth may be acquired from the depths of each of the control points or from the range image. The effect of the outlier caused by an erroneous correspondence or an error in measuring the distance can thus be reduced.

Furthermore, according to the first exemplary embodiment, the measurement information is weighted based on the error in the three-dimensional space when performing robust estimation for reducing the effect of the outlier. However, the weighting method is not limited to the above, and weighting may be performed based on the error in the two-dimensional image. The error may thus be weighted as expressed in equation (13).

[Math. 10]

$$w(d-r) = \begin{cases} (1 - ((d-r)/c_1)^2)^2 & |d-r| \leq c_3 \\ 0 & |d-r| > c_3 \end{cases} \quad (13)$$

In equation (13), $c_3$ is a constant.

Moreover, according to the first exemplary embodiment, a plurality of hypotheses are detected by performing edge detection base on the input approximate position and orientation. The hypothesis nearest to the line segment projected according to the approximate value of the position and orientation is then selected as the edge corresponding to the control point in the repeating loop. In other words, the edge detection is performed only once for one measurement. However, if there is enough calculation time, the edge detection may be included in the repeating loop instead of the selection of the corresponding point. The edge detection may then be performed every time the approximate value of the position and orientation is corrected. As a result, the correct edge can be detected as the number of repetitions increases, even when the difference between the initially input approximate position and orientation and the actual position and orientation is great. The position and orientation can thus be measured with high accuracy.

According to the first exemplary embodiment, the error in the image is converted to correspond to the error in the three-dimensional space. The position and orientation is then estimated using the two-dimensional image and the range image simultaneously under the equivalent evaluation scale. According to a second exemplary embodiment of the present invention, the three-dimensional geometric model is fitted to the measurement information using maximum likelihood estimation and employs likelihood as the common evaluation scale. Since the configuration of the position and orientation measuring apparatus and the process for measuring the position and orientation according to the second exemplary embodiment are similar to those according to the first exemplary embodiment, description is omitted.

According to the present exemplary embodiment, the likelihood indicates the likelihood of an error occurring between a value calculated based on a given position and orientation of the object (i.e., a predicted value) and the actually measured value. It is also assumed that there is ambiguity only in a direction of a search line of the edge detected from the image, and that the detection error of the edge follows a one-dimensional Gaussian distribution of an average 0 and a standard deviation .sigma.2D. It is difficult to estimate the standard deviation .sigma.2D in the actual image, so that .sigma.2D is set to 1 pixel by assuming that the detection error of the edge is caused by the quantization error of the image. If the error between the predicted value and the measured value is err2D (i.e., a scalar value) as a "distance between an edge and a projected line segment", the likelihood is expressed as equation (14).

[Math. 11]

$$p(err_{2D}) = \frac{1}{\sqrt{2\pi}\,\sigma_{2D}} \exp\left(-\frac{1}{2}\left(\frac{err_{2D}}{\sigma_{2D}}\right)^2\right) \quad (14)$$

Further, it is assumed that a measurement error of the three-dimensional point group measured by the range sensor follows a three-dimensional Gaussian distribution of average 0 and a covariance matrix .capital sigma. The covariance matrix .capital sigma. is a 3×3 matrix, and variance within the axis is set to the diagonal component, and cross-covariance between the axes is set to the non-diagonal component. The estimated value of .capital sigma. can be calculated based on the measurement accuracy which is released as a specification of the range sensor.

In the method according to the first exemplary embodiment (i.e., the method for minimizing the distance between the three-dimensional point and the corresponding plane), only the ambiguity in the normal direction of the plane contributes to the calculation of the position and orientation of the object. A standard deviation .sigma.3D of the measurement error in the normal direction of the plane is thus calculated from the covariance matrix of the measurement error of the point group. More specifically, a rotation matrix between the coordinate system of the plane and the camera coordinate system is indicated as R. RT.capital sigma.R transformation is then performed on the covariance matrix .capital sigma. to be transformed to the covariance matrix in the camera coordinate system, and the standard deviation in the normal vector direction is extracted. When the error between the predicted value and the actually measured value (i.e., the distance between the three-dimensional point and the plane) of the position and orientation of the object is err3D, the likelihood is expressed as equation 15.

[Math. 12]

$$p(err_{3D}) = \frac{1}{\sqrt{2\pi}\,\sigma_{3D}} \exp\left(-\frac{1}{2}\left(\frac{err_{3D}}{\sigma_{3D}}\right)^2\right) \quad (15)$$

The maximum likelihood estimation estimates an unknown parameter (i.e., the position and orientation of the object), so that a product of the likelihoods of each of the measurement information calculated by the following equation becomes a maximum value.

[Math. 13]

$$L = \prod_{i=1}^{M} p(err_{2D}^i) \prod_{j=1}^{N} p(err_{3D}^j) = \left(\frac{1}{\sqrt{2\pi}\,\sigma_{2D}}\right)^M$$

$$\exp\left(-\frac{1}{2}\sum_{i=1}^{M}\left(\frac{err_{2D}^i}{\sigma_{2D}}\right)^2\right)\left(\frac{1}{\sqrt{2\pi}\,\sigma_{3D}}\right)^N \exp\left(-\frac{1}{2}\sum_{j=1}^{N}\left(\frac{err_{3D}^j}{\sigma_{3D}}\right)^2\right)$$

More specifically, the unknown parameter is estimated so that a sign-inversed log of the product of the likelihoods as described becomes a minimum value.

[Math. 14]

$$-\log(L) = -\log\left(\frac{1}{\sqrt{2\pi}\,\sigma_{2D}}\right)^M +$$

$$\frac{1}{2}\sum_{i=1}^{M}\left(\frac{err_{2D}^i}{\sigma_{2D}}\right)^2 - \log\left(\frac{1}{\sqrt{2\pi}\,\sigma_{3D}}\right)^N + \frac{1}{2}\sum_{j=1}^{N}\left(\frac{err_{3D}^j}{\sigma_{3D}}\right)^2$$

Since the first term and the third term in the above-described equation are constants that do not depend on the position and orientation, the unknown parameter is estimated to minimize equation (16).

[Math. 15] (16)

$$\frac{1}{2}\sum_{i=1}^{M}\left(\frac{err_{2D}^i}{\sigma_{2D}}\right)^2 + \frac{1}{2}\sum_{j=1}^{N}\left(\frac{err_{3D}^j}{\sigma_{3D}}\right)^2$$

The difference between the first exemplary embodiment and the second exemplary embodiment is the calculation of the coefficient matrix and the error vector in the position and orientation calculation algorithm.

A method for calculating the position and orientation to minimize equation (16) will be described below. The inverse of the standard deviation of the edge detection error .sigma.2D is multiplied by an equation acquired regarding the edge, i.e.,

[Math. 16]

$$\sin\theta \sum_{i=1}^{6}\frac{\partial u}{\partial s_i}\Delta s_i - \cos\theta \sum_{i=1}^{6}\frac{\partial v}{\partial s_i}\Delta s_i = d - r$$

Further, the inverse of the standard deviation of the measurement error in the normal direction of the plane .sigma.3D is multiplied by an equation acquired regarding the point group, i.e.,

[Math. 17]

$$a\sum_{i=1}^{6}\frac{\partial x}{\partial s_i}\Delta s_i + b\sum_{i=1}^{6}\frac{\partial y}{\partial s_i}\Delta s_i + c\sum_{i=1}^{6}\frac{\partial z}{\partial s_i}\Delta s_i = e - q$$

As a result, a linear simultaneous equation as in equation (17) is acquired.

[Math. 18] (17)

$$\begin{bmatrix} \left(\sin\theta_2\frac{\partial u}{\partial s_1} - \cos\theta_2\frac{\partial v}{\partial s_6}\right)/\sigma_{30} \cdots \\ \left(\sin\theta_2\frac{\partial u}{\partial s_1} - \cos\theta_2\frac{\partial v}{\partial s_6}\right)/\sigma_{30} \\ \left(\sin\theta_2\frac{\partial u}{\partial s_1} - \cos\theta_1\frac{\partial v}{\partial s_6}\right)/\sigma_{30} \cdots \\ \left(\sin\theta_2\frac{\partial u}{\partial s_1} - \cos\theta_1\frac{\partial v}{\partial s_6}\right)/\sigma_{30} \\ \vdots \\ \left(a_1\frac{\partial x}{\partial s_1} + b_1\frac{\partial y}{\partial s_1} + c_1\frac{\partial z}{\partial s_1}\right)/\sigma_{10} \cdots \\ \left(a_1\frac{\partial x}{\partial s_6} + b_1\frac{\partial y}{\partial s_6} + c_2\frac{\partial z}{\partial s_6}\right)/\sigma_{10} \\ \left(a_1\frac{\partial x}{\partial s_1} + b_1\frac{\partial y}{\partial s_1} + c_1\frac{\partial z}{\partial s_1}\right)/\sigma_{10} \cdots \\ \left(a_1\frac{\partial x}{\partial s_6} + b_2\frac{\partial y}{\partial s_6} + c_2\frac{\partial z}{\partial s_6}\right)/\sigma_{10} \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} (d_1 - r_1)\sigma_{30} \\ (d_2 - r_2)\sigma_{30} \\ \vdots \\ (e_1 - q_2)/\sigma_{10} \\ (e_2 - q_2)/\sigma_{10} \\ \vdots \end{bmatrix}$$

The correction value of the position and orientation of the object is calculated based on the equation (17). Since the other processes are similar to those described in the first exemplary embodiment, description will be omitted.

As described above, according to the second exemplary embodiment, the position and orientation is measured using the two-dimensional image and the range image simultaneously by employing the likelihood of the measurement information as the uniformed scale.

According to the second exemplary embodiment, the same covariance matrix .capital sigma. is used for each of the points in the point group data. However, it is not necessary for the covariance matrix to be the same for all of the point information. If the range sensor is capable of outputting reliability of the measurement in units of pixels and points, the covariance matrix may be calculated for each point based on the reliability and be used.

Further, according to the second exemplary embodiment, the distribution of the edge detection error follows the same standard deviation. However, the present invention is not limited to the above. In other words, if the ambiguity of the detection can be estimated for each edge detected in the image, the standard deviation may be calculated based on the ambiguity and may be changed for each edge. The ambiguity of the edge detection may employ a kernel size used in the edge detection. As a result, a small weight is applied to an ambiguous edge, and a large weight is applied to an edge which is detected with high accuracy, so that the position and orientation can be calculated with higher accuracy.

According to the first and second exemplary embodiments, the position and orientation of the object is calculated using the two-dimensional image and the three-dimensional measurement information simultaneously. According to the third exemplary embodiment of the present invention, the position and orientation of the object is calculated by separately using the two-dimensional image and the three-dimensional point group instead of using them simultaneously. The two results are then integrated. Since the configuration of the position and orientation measuring apparatus and the process for measuring the position and orientation are similar to those in the first exemplary embodiment, description will be omitted.

FIG. 9 is a flowchart illustrating in detail the process for calculating the position and orientation according to the third exemplary embodiment. The process corresponds to the process performed in step S304 illustrated in the flowchart of FIG. 3.

In step S901 illustrated in FIG. 9, the position and orientation calculation unit 160 calculates the position and orientation of the object by using only the three-dimensional point group. The process for calculating the position and orientation is basically the same as the method described in the first exemplary embodiment, and the use of the three-dimensional point group data is the only difference. The position and orientation of the object which is calculated based on the three-dimensional point group data is expressed by a six-dimensional vector s3D. The position and orientation calculation unit 160 simultaneously calculates a 6×6 covariance matrix .capital sigma.3D which indicates the ambiguity of the calculated position and orientation. The position and orientation calculation unit 160 uses the covariance matrix .capital sigma.3D to later integrate the calculated position and orientation with the position and orientation to be calculated based on the two-dimensional image. The position and orientation calculation unit 160 calculates the covariance matrix of the position and orientation as described below. The position and orientation calculation unit 160 thus calculates the position and orientation using a 2D-2D correspondence and a 3D-3D correspondence (W. Hoff and T. Vincent, "Analysis of head orientation accuracy in augmented reality", IEEE Transactions on Visualization and Computer Graphics, vol. 6, no. 4, pp. 319-334, 2000).

According to the present exemplary embodiment, the position and orientation calculation unit 160 calculates the covariance matrix based on a correspondence between the point and a plane in the three-dimensional space, and a correspondence between the point and the line in the two-dimensional image. A component of the measurement error of the point group data in the normal direction of the plane is indicated as .capital delta.p, and the standard deviation thereof as .sigma.3D. The standard deviation .sigma.3D is calculated by the same method as described in the second exemplary embodiment. If it is assumed that .capital delta.p corresponds to a minor change .capital delta.s3D, equation (18) is acquired by performing a linear approximation (for definition of symbols, refer to Hiura, Yamaguchi, Sato, Ikenouchi, "Real-Time Tracking of Free-Form Objects by Range and Intensity Image Fusion", Denshi Joho Tsushin Gakkai Ronbunshi, Vol. J80-D-II, No. 11, November 1997, pp. 2904-2911).

[Math. 19] (18)

$$\Delta p = \left[ a \frac{\partial x}{\partial s_1} + b \frac{\partial y}{\partial s_1} + c \frac{\partial z}{\partial s_1} \cdots a \frac{\partial x}{\partial s_6} + b \frac{\partial y}{\partial s_6} + c \frac{\partial z}{\partial s_6} \right] \begin{bmatrix} \Delta s_1 \\ \Delta s_2 \\ \Delta s_3 \\ \Delta s_4 \\ \Delta s_5 \\ \Delta s_6 \end{bmatrix}$$

Equation (19) is then acquired by integrating equation (18) for all points in the three-dimensional point group data.

[Math. 20] (19)

$$\begin{bmatrix} \Delta p_1 \\ \Delta p_2 \\ \vdots \\ \Delta p_n \end{bmatrix} = \begin{bmatrix} J_1 \\ J_2 \\ \vdots \\ J_n \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix}$$

wherein

[Math. 21]

$$J_1 = \left[ a_1 \frac{\partial x}{\partial s_2} + b_1 \frac{\partial y}{\partial s_1} + c_1 \cdots a_1 \frac{\partial x}{\partial s_6} + b_1 \frac{\partial y}{\partial s_6} + c_1 \frac{\partial z}{\partial s_6} \right]$$

Equation (19) may thus be expressed as in equation (20).

[Math. 22]

$$\Delta P = J \Delta s_{3D} \quad (20)$$

Based on equation (20), .capital delta.s3D is then calculated as equation (21) using a least-square method.

[Math. 23]

$$\Delta s_{2D} = (J^T J)^{-1} J^T \Delta P \quad (21)$$

The covariance matrix .capital sigma.3D of .capital delta.s3D thus becomes as follows. E [ . . . ] indicates an expectation value of . . . .

[Math. 24] (22)

$$\sum_{3D} = E[\Delta s_{3D} \Delta s_{3D}^T]$$
$$= E\left[ (J^T J)^{-1} J^T \Delta P \Delta P^T \left( (J^T J)^{-1} J^T \right)^T \right]$$
$$= (J^T J)^{-1} J^T E[\Delta P \Delta P^T] \left( (J^T J)^{-1} J^T \right)^T$$
$$= (J^T J)^{-1} J^T \begin{bmatrix} {}_1\sigma_{3D}^2 & 0 & 0 & 0 \\ 0 & {}_2\sigma_{3D}^2 & 0 & 0 \\ 0 & 0 & \ddots & 0 \\ 0 & 0 & 0 & {}_N\sigma_{3D}^2 \end{bmatrix} \left( (J^T J)^{-1} J^T \right)^T$$

In other words, the covariance matrix .capital sigma.3D of the position and orientation of the object is calculated from the standard deviation of the measurement error of the point group data, the three-dimensional plane parameter, and a linear partial differentiation (a Jacobian matrix) of the position and orientation in the three-dimensional coordinate.

In step S902, the position and orientation calculation unit 160 calculates the position and orientation of the object using only the two-dimensional image. The position and orientation calculation unit 160 calculates the position and orientation by only using the edge in the calculation method described in the first exemplary embodiment. The acquired position and orientation is expressed as a six-dimensional vector s2D. The position and orientation calculation unit 160 calculates a 6×6 covariance matrix .capital sigma.2D which indicates the ambiguity of the calculated position and orientation, simultaneously as calculating the position and orientation. The position and orientation calculation unit 160 uses the covariance matrix later to integrate the calculated position and orientation with the position and orientation calculated in step S901. The position and orientation calculation unit 160 calculates the covariance matrix .capital sigma.2D of the position and orientation as described below.

A detection error in the search direction of the edge is indicated as .capital delta.d, and the standard deviation thereof as .sigma.2D. The standard deviation .sigma.2D is calculated by the same method according to the second exemplary embodiment. If it is assumed that .capital delta.d corresponds to a minute change .capital delta.s2D, equation (23) is acquired by performing a linear approximation (for definition of symbols, refer to the first exemplary embodiment).

[Math. 25]

$$\Delta d = \left[\sin\theta \frac{\partial u}{\partial s_1} - \cos\theta \frac{\partial v}{\partial s_1} \quad \ldots \quad \sin\theta \frac{\partial u}{\partial s_6} - \cos\theta \frac{\partial v}{\partial s_6}\right] \begin{bmatrix} \Delta s_1 \\ \Delta s_2 \\ \Delta s_3 \\ \Delta s_4 \\ \Delta s_5 \\ \Delta s_6 \end{bmatrix} \quad (23)$$

Equation (24) is then acquired by integrating the equation (23) for all edges.

[Math. 26]

$$\begin{bmatrix} \Delta d_1 \\ \Delta d_2 \\ \vdots \\ \Delta d_N \end{bmatrix} = \begin{bmatrix} K_1 \\ K_2 \\ \vdots \\ K_N \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} \quad (24)$$

wherein

[Math. 27]

$$K_r = \left[\sin\theta_r \frac{\partial u}{\partial s_1} - \cos\theta_r \frac{\partial v}{\partial s_1} \sin\theta_r \frac{\partial u}{\partial s_1} - \cos\theta_r \frac{\partial v}{\partial s_1} \quad \ldots \quad \sin\theta_r \frac{\partial u}{\partial s_6} - \cos\theta_r \frac{\partial v}{\partial s_6}\right]$$

The equation (24) may thus be expressed as in equation (25).

[Math. 28]

$$\Delta D = K \Delta s_{2D} \quad (25)$$

The covariance matrix .capital sigma.2D is then acquired as in equation (26) by calculating similarly as calculating .capital sigma.3D.

[Math. 29]

$$\sum_{2D} = (K^T K)^{-1} K^T \begin{bmatrix} {}_1\sigma_{2D}^2 & 0 & 0 & 0 \\ 0 & {}_2\sigma_{2D}^2 & 0 & 0 \\ 0 & 0 & \ddots & 0 \\ 0 & 0 & 0 & {}_M\sigma_{2D}^2 \end{bmatrix} \left((K^T K)^{-1} K^T\right)^T \quad (26)$$

In other words, the covariance matrix .capital sigma.2D is calculated from the standard deviation of the edge detection error, the equation for the line segment projected on the image, and the linear partial differentiation (the Jacobian matrix) of the position and orientation in the image coordinate.

In step S903, the position and orientation calculation unit 160 integrates the position and orientation s3D calculated based on the three-dimensional measurement information with the position and orientation s2D calculated based on the two-dimensional image. More specifically, if $s_{final}$ is the six-dimensional vector indicating the integrated position and orientation, it is calculated as in equation (27).

[Math. 30]

$$s_{final} = \Sigma_{2D}(\Sigma_{2D} + \Sigma_{3D})^{-1} s_{3D} + \Sigma_{3D}(\Sigma_{2D} + \Sigma_{3D})^{-1} s_{2D} \quad (27)$$

By performing the above-described calculation, the ambiguity of each of the position and orientation is compensated by the mutual measurement results. As a result, the position and orientation can be measured with high accuracy.

As described above, according to the third exemplary embodiment, the position and orientation of the object is calculated separately from the two-dimensional image and the three-dimensional point group data. The resulting positions and orientations are then integrated using the calculated covariance matrices of the positions and orientations to measure the position and orientation of the object.

In the above-described exemplary embodiments, the edge is used as the feature in the two-dimensional image. However, the feature in the two-dimensional image is not limited to the edge, and other features may be used. For example, the three-dimensional model of the target object may be expressed as the three-dimensional point group data. The position and orientation may then be calculated based on a correspondence between the feature points detected as the image feature and the points in the three-dimensional space. Further, a plurality of features (e.g., the feature points and edges) may be used in calculating the position and orientation instead of only using a specific feature.

Furthermore, in the above-described exemplary embodiments, the range sensor which outputs a dense range image is used as the three-dimensional measuring apparatus. However, the three-dimensional measuring apparatus is not limited to the above and may perform sparse measurement. For example, the three-dimensional measuring apparatus may be a range measuring apparatus using spot light.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An apparatus comprising:
   a processor; and
   a memory containing instructions that, when executed by the processor, perform operations of:
   a three-dimensional information obtaining unit configured to obtain range information of a surface of an object, which is measured by an active range sensor;
   an obtaining unit configured to obtain a plurality of edge features representing a shape of the object from an image including the object;
   an associating unit configured to associate a plurality of geometric features which are features on a line of a three-dimensional shape model of the object with the obtained plurality of edge features respectively and a plurality of second geometric features which are features on a plane of the three-dimensional shape model of the object with the range information of the surface of the object respectively, based on an approximate position and orientation of the object; and
   a deriving unit configured to derive a position and orientation of the object based on a result of an association by the associating unit.

2. The apparatus according to claim 1, wherein the three-dimensional model is a CAD model.

3. The apparatus according to claim 1, wherein the range information is obtained from a range image including the object.

4. The apparatus according to claim 1, wherein the associating unit projects a first geometric feature in the geometric features onto the image based on the approximate position and orientation of the object and searches for an edge feature which is the nearest to the projected first geometric feature on the image and associates the searched edge feature with the first geometric feature.

5. The apparatus according to claim 1, wherein the deriving unit derives the position and orientation of the object by repeating an associating process of the associating unit.

6. The apparatus according to claim 1, wherein the image is a captured image of the object.

7. The apparatus according to claim 1, wherein the image is a grey scale image.

8. The apparatus according to claim 1, wherein the range information indicates the three-dimensional coordinates of a point group on a surface of the object acquired from a range image.

9. The apparatus according to claim 1, wherein the edge feature is a pixel having an extreme value of a gradient.

10. The apparatus according to claim 1, further comprising:
    an acquiring unit configured to acquire a first differences between the associated plurality of edge features and a plurality of first geometric features, and second differences between the associated plurality of three-dimensional coordinates indicated by the range information of the surface and the plurality of second geometric features,
    wherein the deriving unit derives the position and orientation of the object based on a result of an association by the association unit so that the first differences and the second difference decrease.

11. The apparatus according to claim 1, wherein the image represents a two-dimensional shape of the object.

12. A method comprising:
    obtaining a plurality of edge features representing a shape of an object from an image including the object;
    obtaining range information of a surface of the object, which is measured by an active range sensor;
    associating a plurality of geometric features which are features on a line of a three-dimensional shape model of the object with the obtained plurality of edge features respectively and a plurality of second geometric features which are features on a plane of the three-dimensional shape model of the object with the range information of the surface of the object respectively, based on an approximate position and orientation of the object; and
    deriving a position and orientation of the object based on a result in the associating.

13. A non-transitory computer-readable-storage medium storing computer-executable instructions for executing processing includes:
    computer-executable instructions for obtaining range information of a surface of an object, which is measured by an active range sensor;
    computer-executable instructions for obtaining a plurality of edge features representing a shape of the object from an image including the object;
    computer-executable instructions for associating a plurality of geometric features which are features on a line of a three-dimensional shape model of the object with the obtained plurality of edge features respectively and a plurality of second geometric features which are features on a plane of the three-dimensional shape model of the object with the range information of the surface of the object respectively, based on an approximate position and orientation of the object; and
    computer-executable instructions for deriving a position and orientation of the object based on a result of the associating.

14. An apparatus comprising:
    three-dimensional information obtaining means for obtaining range information of a surface of an object, which is measured by an active range sensor;
    obtaining means for obtaining a plurality of edge features representing a shape of the object from an image including the object;
    associating means for associating a plurality of geometric features which are features on a line of a three-dimensional shape model of the object with the obtained plurality of edge features respectively and a plurality of second geometric features which are features on a plane of the three-dimensional shape model of the object with the range information of the surface of the object respectively, based on an approximate position and orientation of the object; and
    deriving means for deriving a position and orientation of the object based on a result of an association by the associating means.

* * * * *